US008955043B2

(12) United States Patent
Swamy et al.

(10) Patent No.: US 8,955,043 B2
(45) Date of Patent: Feb. 10, 2015

(54) TYPE-PRESERVING COMPILER FOR SECURITY VERIFICATION

(75) Inventors: Nikhil Swamy, Seattle, WA (US); Juan Chen, Sammamish, WA (US); Ravi Kumar Chugh, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 12/694,295

(22) Filed: Jan. 27, 2010

(65) Prior Publication Data

US 2011/0185345 A1 Jul. 28, 2011

(51) Int. Cl.
*G06F 7/04* (2006.01)
*G06F 9/45* (2006.01)
*G06F 21/54* (2013.01)
*G06F 21/14* (2013.01)

(52) U.S. Cl.
CPC ............... *G06F 8/436* (2013.01); *G06F 21/54* (2013.01); *G06F 21/14* (2013.01)
USPC ................................................. 726/2; 705/51

(58) Field of Classification Search
CPC ............ G06F 9/45; G06F 21/14; G06F 21/54
See application file for complete search history.

(56) References Cited

U.S. PATENT DOCUMENTS

| | | | |
|---|---|---|---|
| 6,549,903 B1* | 4/2003 | Babaian et al. ................ 711/108 |
| 6,986,143 B2* | 1/2006 | Cole et al. ...................... 719/315 |
| 7,086,041 B2* | 8/2006 | Plesko et al. ................... 717/141 |
| 7,810,077 B2* | 10/2010 | Bracha ............................ 717/131 |
| 2004/0148592 A1* | 7/2004 | Vion-Dury ..................... 717/152 |
| 2004/0216086 A1* | 10/2004 | Bau ................................ 717/114 |
| 2005/0193369 A1 | 9/2005 | Brumme et al. |
| 2006/0101047 A1* | 5/2006 | Rice ................................ 707/101 |
| 2006/0143689 A1 | 6/2006 | Yu et al. |
| 2007/0156727 A1* | 7/2007 | Lim ................................ 707/100 |
| 2007/0169168 A1* | 7/2007 | Lim ..................................... 726/1 |
| 2007/0256060 A1* | 11/2007 | Ryu et al. ....................... 717/140 |
| 2008/0147698 A1* | 6/2008 | Gustafsson et al. .......... 707/101 |
| 2008/0154575 A1* | 6/2008 | Muschett ......................... 703/27 |
| 2008/0235675 A1* | 9/2008 | Chen .............................. 717/147 |
| 2009/0193392 A1 | 7/2009 | Downen et al. |
| 2010/0333065 A1* | 12/2010 | Sverdlov et al. .............. 717/118 |
| 2012/0284389 A1* | 11/2012 | Azagury et al. .............. 709/223 |

OTHER PUBLICATIONS

The Authoritative Dictionary of IEEE Standards Terms, 7th Ed., IEEE, Inc., New York, NY, Dec. 2000.*
"Satisfiability Modulo Theories", wikipedia, all pages, date unknown. http://en.wikipedia.org/wiki/Satisfiability_Modulo_Theories.*

(Continued)

*Primary Examiner* — Calvin Cheung
(74) *Attorney, Agent, or Firm* — Sandy Swain; Sade Fashokun; Micky Minhas

(57) ABSTRACT

Described is a source program code language that facilitates the association of security proofs obtained from a solver (e.g., a Z3 theorem prover) with the program code. The code may include affine types, dependent types and/or refinement types. A derefinement procedure replaces each refinement type with a dependent pair type corresponding to the proof. A target code type checker verifies the target code with respect to the security policies. If verified as complying with security policy, a verified program corresponding to the translated program may then be installed and run.

20 Claims, 7 Drawing Sheets

(56) References Cited

OTHER PUBLICATIONS

Plaza et. al., "An improved derefinement algorithm of nested meshes", all pages, 1996. http://geminis.dma.ulpgc.es/~aplaza/ficheros/investigacion/ficheros/aes96.pdf.*

Chen et. al., "Type-preserving Compilation for End-to-end Verification of Security Enforcement", all pages, Jun. 2010. http://cseweb.ucsd.edu/~rchugh/research/pldi10-fine.pdf.*

L. Cardelli, "Typechecking Dependent Types and Subtypes." In Proceedings of Foundations of Logic and Functional Programming. 1986, p. 45-57. http://lucacardelli.name/Papers/Dependent%20Typechecking%20(Scan).pdf.*

League et. al., "Type-Preserving Compilation of Featherweight Java", ACM Transactions on Programming Languages and Systems (TOPLAS), vol. 24 Issue 2, Mar. 2002, all pages. http://contrapunctus.net/league/research/papers/fj-toplas.pdf.*

C. League, "A Type-Preserving Compiler Infrastructure", Dec. 2002. http://www.dtic.mil/dtic/tr/fulltext/u2/a436496.pdf.*

Chen et. al. "Type-Preserving Compilation for Large-Scale Optimizing Object-Oriented Compilers" Microsoft, Jun. 2008, all pages. http://research.microsoft.com/pubs/63653/pldi165-chen.pdf.*

Swamy, et al., "Fable: a Language for Enforcing User-defined Security Policies", Retreived at<<http://www.cs.umd.edu/~nswamy/papers/fable-tr.pdf>>, May 28, 2008, pp. 1-48.

Sabelfeld, et al., "Language-Based Information-Flow Security", Retreived at<<http://www.cs.cornell.edu/andru/papers/jsac/sm-jsac03.pdf>>, Jan. 14, 2003, IEEE Journal on Selected Areas in Communications, vol. 21, No. 1,pp. 1-15.

Jia, et al., "Aura: A Programming Language for Authorization and Audit", Retreived at <<http://www.seas.upenn.edu/~liminjia/papers/aura-icfp.pdf>>, Sep. 22-24, 2008, pp. 12.

Myers Andrew, "Using Security Policies to Write Secure Software", Retrieved at<<http://asimod.in.tum.de/2009/Myers_Abs_09.pdf>>, Sep. 15, 2009, pp. 19-20.

* cited by examiner

FIG. 4 p-Evaluation context  $E_p ::= \bullet \mid E_p\, e \mid v_p\, E_p \mid E_p\, \tau \mid \text{match } E_p \text{ with } D\, \vec{?}\, \vec{x} \to e_1\, \text{else } e_2$   Store  $M ::= \cdot \mid (x, v_p), M$ .

$$\langle v_p \rangle_p \stackrel{p}{\leadsto} v_p \text{ (E-Strip)} \quad \langle\langle v_q \rangle_q\rangle_r \stackrel{p}{\leadsto} \langle v_q \rangle_q \text{ (E-Nest)} \quad \langle \lambda x{:}t.e \rangle_q \stackrel{p}{\leadsto} \lambda y{:}t.\langle e[\langle y \rangle_p / x] \rangle_q \text{ (E-Ext)} \quad \langle A\alpha{::}\kappa.e \rangle_q \stackrel{p}{\leadsto} A\alpha{::}\kappa.\langle e \rangle_q \text{ (E-TExt)}$$

$$\dfrac{e \stackrel{q}{\leadsto} e'}{\langle e \rangle_q \stackrel{p}{\leadsto} \langle e' \rangle_q} \text{ (E-Br)} \qquad \dfrac{S;\cdot;\vdash v_p : \tau \quad S;\cdot;\vdash \tau :: A \quad M' = M, (x, v_q)}{M, v_p \stackrel{p}{\leadsto} M', x} \text{ (E-Construct)} \quad \dfrac{M = M', (x, v_q)}{M, x \stackrel{p}{\leadsto} M', v_q} \text{ (E-Destruct)}$$

TYPE-PRESERVING COMPILER FOR SECURITY VERIFICATION

BACKGROUND

Many modern software systems are assembled from components ("plugins") provided by multiple third party vendors. Whether due to malice or mistake, such third-party components pose a security risk. To help a user protect sensitive information from abuse or problems caused by plugins, some software platforms aim to apply security policies to control a plugin's behavior.

However, the policies used in practice are often complex, and often also address various aspects of security, including, for example, role-based access control and information flow tracking. Reliably enforcing such policies is difficult, and reports of security vulnerabilities due to incorrect enforcement are common.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a compiler compiles source program code (e.g., a plugin component) written in a source language that allows associating security proofs with the program code. The code may include affine types, dependent types and/or refinement types.

In one aspect, the compiler includes a type checker coupled to an external solver (e.g., an SMT solver like Z3) that provides the proofs; (an internal solver may instead be used). The source program and the proofs are translated into target code in which a derefinement procedure replaces each value of a refinement type with a dependent pair comprising the value and the corresponding proof. The external solver is then not further needed. A target code type checker verifies the target code with respect to the security policies. If verified as complying with security policy, the target code may then be installed and run.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIGS. 2-4 comprise a representation of static semantics of a source program language that provides for associating security proofs with the code.

FIG. 5 is a representation of dynamic semantics of a source program language that provides for associating security proofs with the code.

FIG. 6 is a representation of static semantics of an intermediate program language translated from the source program.

DETAILED DESCRIPTION

Various aspects of the technology described herein are generally directed towards verifying that security policies with respect to software components are correctly enforced, in a manner that allows code consumers to check that the components they receive are secure before installing them.

While Microsoft .NET is used as an example herein, it should be understood that any of the examples described herein are non-limiting examples; other bytecode software/managed environments may benefit from the described technology. Moreover, the representation of stateful policies as described herein is based on a general framework for reasoning about known dynamic policies, and is applicable to checking the enforcement of stateful, Datalog-based policies. Thus, the technology described herein is relevant to other applications that may also have stateful Datalog-based policies.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing in general.

Figure 1:
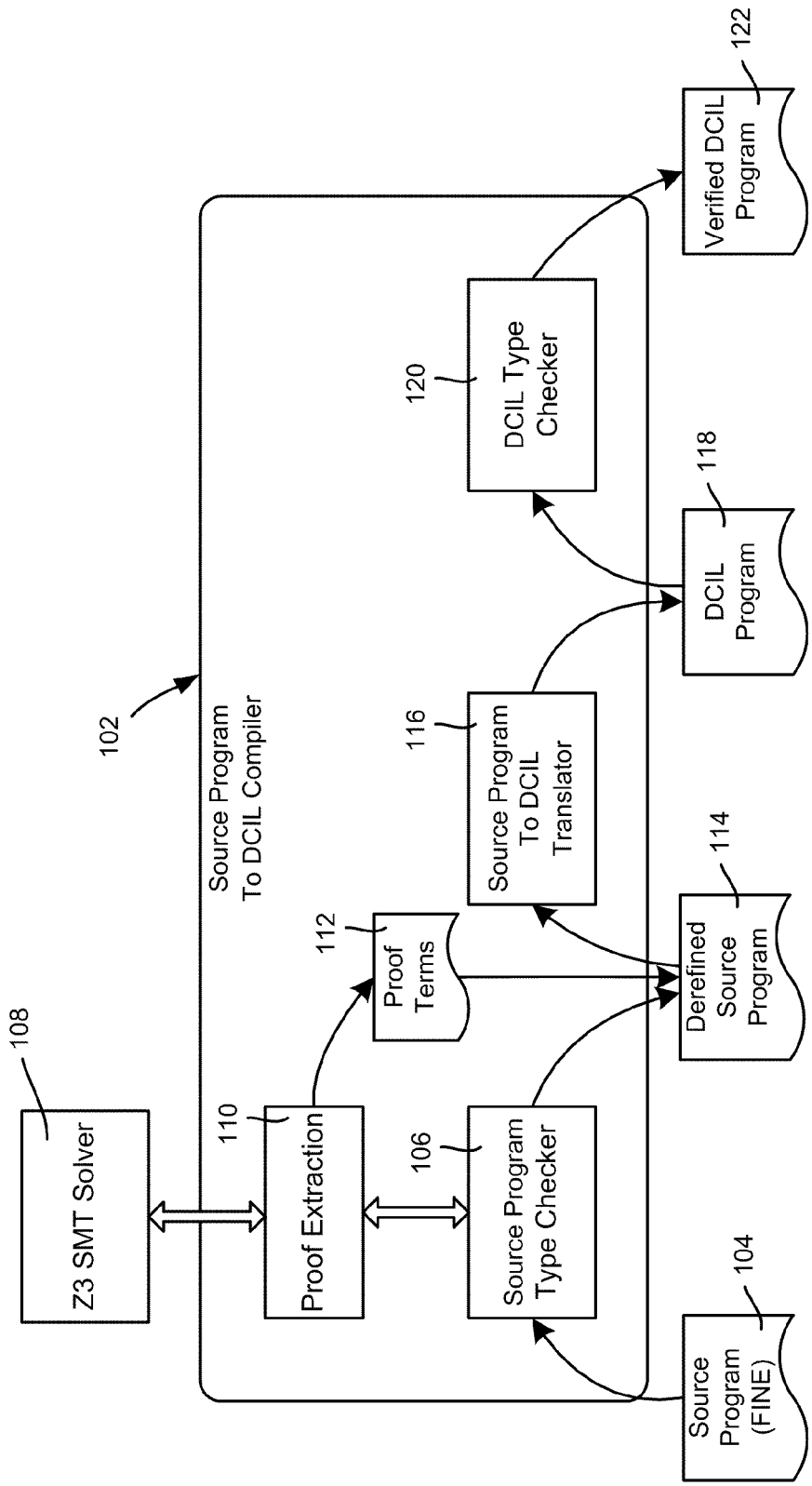
FIG. 1 is a block diagram showing example components for compiling a source program into an intermediate program having verifiable security proofs associated therewith.

FIG. 1 shows various aspects related to a compiler 102 for a source program 104 written in a source code programming language ("FINE") described herein. As will be understood, the compiler 102 implements a type system that allows the enforcement of rich, stateful authorization and information flow policies to be verified.

In general, in a first phase, the source program 104 written in the FINE programming language is processed by a source program type checker 106. The programming language integrates various types (including affine types and dependent and refinement types, described below) in a highly expressive manner, which enables integration of the type checker 106 with an external solver 108 via proof extraction 110. Note that prior languages for verifying security properties have not included affine types at all, or have not done so in a manner that enables integration with a solver. Further note that the solver may be internal in alternative implementations.

With respect to types, the FINE programming language is used by the compiler 102, and includes dependent types and refinement types. These types may be used to express authorization policies by including first-order logical formulas in the types of program expressions. Also included are affine types, comprising a facility that allows modeling changes to the state of an authorization policy.

In one implementation, the combination of affine and dependent types keeps the metatheory straightforward by ensuring that affine variables never appear in types, while still allowing the state of a program to be refined by logical formulas. Also described is a module system for the programming language that provides an information-hiding property. In combination with the other features, the module system allows the programs to properly track information flow.

The compiler 102 implements a procedure that allows security proofs 112 to be carried in the program text, in a manner that allows these proofs to be checked for validity using a purely syntactic algorithm. Note that programming with advanced typing constructs and dealing with proofs can place a significant burden on the programmer; to reduce the burden, the FINE compiler uses an off-the-shelf solver 108 such as Z3 to automatically discharge proof obligations. However, unlike prior languages, the solver 108 is removed from the TCB (trusted computing base) by extracting proofs from the solver as typeable FINE values.

The procedure that translates the FINE source program 104 and allows security proofs to be carried along with the main program text is referred to herein as "derefinement." Derefinement is represented in FIG. 1 by the derefined source program 114.

The interface with the solver 108 is simplified by the combination of affine and dependent types. Refinement formulas only involve standard logical connectives, avoiding the need for an embedding of linear logic in the solver 108.

One compilation technique produces verifiable target code in a language called DCIL, or Dependent Common Intermediate Language, (an extension of CIL, which is the language of the .NET runtime). As described below, a source program to DCIL translator 116 processes the derefined source program 114 into a DCIL program 118. Code consumers can check such a DCIL program 118 using a syntactic bytecode verifier to establish the security of the code. This is represented in FIG. 1 by the DCIL type checker 120 which provides a verified DCIL program 122.

DCIL includes two technical facilities, namely type-level functions and value parameters. These allow security properties to be checked in object-oriented, low-level code, unlike other known languages.

With respect to the type-preserving translation of the program 104 to the DCIL program 118, DCIL augments CIL with type-level functions, classes parameterized by values, and affine types. DCIL programs can be checked purely syntactically, without reliance on an external solver, and the additional typing constructs of DCIL can be accommodated within the existing specifications of CIL. For example, value parameters can be encoded in fields, with affine types using type modifiers, and type-level functions using custom attributes. The described approach makes it possible to run DCIL programs on existing .NET virtual machines, as well as to interface with the numerous libraries and tool support (such as IDEs) that exist for .NET. Further, the translation performed by the compiler may be validated with a relatively small TCB. Still further, the approach allows building plugins for programs (one such program, "LOOKOUT" is exemplified below) using FINE, taking advantage of state-of-the-art theorem provers to ease programming, while distributing plugins as DCIL programs that can be type checked for security by end users.

EXAMPLES

The programming language may be used to check that the stateful authorization and information-flow policies applied in practice are correctly enforced. By way of example, one implementation includes a reference monitor and a plugin for a plugin-based utilities client referred to as "LOOKOUT." LOOKOUT defines an interface that allows a plugin to read email from a user's inbox, send email, make appointments in the calendar and so forth. A useful plugin may scan a user's inbox for messages that appear to be meeting requests, automatically make appointments in the calendar, and send email notifications to each sender confirming the appointment.

To ensure that such a plugin cannot steal sensitive email messages from a user's inbox, a user can customize the behavior of LOOKOUT's reference monitor by defining a security policy that combines, for example, aspects of information flow tracking with role-based and history-based access control. The type system of the described programming language ensures that plugins use a reference monitor's API correctly, and in doing so, comply with the user's security policy.

One specific example shows how to enforce a simple authentication and access control policy, including a reference monitor for LOOKOUT. As a further example, the reference monitor is customized by a user-specified policy, and is used to enforce a stateful role-based and history-based authorization policy while tracking information flow.

For simple authentication and access control, one example shows a relatively simple policy, enforced by module "AC" (in the table below). Note that unlike other languages in which the programmer needs to manually construct explicit security proofs, in FINE the type checker uses an SMT solver, Z3, so that programmers do not have such proof obligations. Further note that other languages use an external solver, but include the solver in the TCB. In contrast, the compiler 102 described herein extracts and type checks proof terms from the solver 108, and removes the solver from the TCB, while enabling a type-preserving translation. This facilitates lightweight checking of plugin binaries at the client.

In order to specify and enforce security policies, FINE programmers may define modules that mediate access to sensitive resources. The example module AC in the table below, written in FINE, is a reference monitor for a file system directed towards password authentication and access control:

---

1  module AC
2  type prin = U: string → prin | Admin: prin
3  private type cred :: prin → * = Auth: p:prin → cred p
4  (* Authenticating principals and obtaining credentials *)
5  val login: p:prin → pw:string → option (cred p)
6  let login p pw = if (check_pwd_db_p_pw) then Some (Auth p)
     else None
7  (* A proposition and axiom for defining file permissions *)
8  type CanWrite:: prin → file → *
9  assume Ax1: forall f:file, CanWrite Admin f
10 (* A secure wrapper for a system call *)
11 val fwrite: p:prin → cred p → {f:file j CanWrite p f} → string → unit
12 let fwrite p c f s = Sys.fwrite f s
13 (* A utility function to test the policy *)
14 val check: p:prin → cred p → f:file → {b:bool j b=true)CanWrite p f}
15 let check p c f = match p with Admin → true | _ → false
16 end
17 open AC
18 let client (p:prin) (c:cred p) (f:file) =
19    if check p c f then fwrite p c f "Hello" else ( )

---

The policy enforced by a FINE module includes two components, namely the axioms introduced through the use of the assume construct (e.g., Ax1 at line 9), and the types given to values exposed in the module's interface (e.g., the type of fwrite at line 11). A security review of AC needs to confirm that the assumptions and the types ascribed to values adequately capture the intent of a high-level policy. Significantly, client code need not be examined at all, because typing ensures that clients comply with the reference monitor's security policy.

The AC module implements a password-based authentication mechanism combined with a permission-based access control policy. The module AC defines prin (line 2), a standard variant type that represents principal names as a string for the user's name, or the distinguished constant Admin. The type cred (line 3) is a dependent type constructor that is given the kind prin→*, e.g., (cred Admin) is a legal type of kind *, (the kind of normal types, distinguished from the kind of affine types, described below), and represents a credential for the Admin user. By declaring it private, the module AC indicates that its clients cannot directly use the data constructor Auth. Instead, the only way a client module can obtain a credential is through the use of the login function. The login function (lines 5-6) is given a dependent function type where the first argument p is the name of principal, the second argument pw is a password string, and, if the password check succeeds, login returns a credential for the user p. By indexing the cred with the name of the principal which it authenticates, the system can statically detect common security errors, such as those that arise due to confused deputies, e.g., a client cannot use login to obtain a credential for U "Alice" and later pass it off as a credential for Admin.

Line 8 defines a dependent-type constructor CanWrite that is used to describe authorization permissions. The module AC interprets the type CanWrite p f as the proposition that the principal p can write to the file f. At line 9, AC defines a single policy assumption, Ax1, which states that the principal Admin can write to any file. A client program can use axioms like Ax1 to produce evidence of the propositions needed to call functions like fwrite, which wraps a call to Sys.fwrite. Client programs are assumed to not have direct access to sensitive system calls like Sys.fwrite. The first two arguments of fwrite require the caller to present a credential for the principal p. The third argument is a file handle with a refined type—the type {f:file|CanWrite p f} is inhabited by any value f of type file for which the proposition CanWrite p f can be proved. The fourth argument to fwrite is the string to be written to the file.

AC also provides a utility function "check" that clients can use to query the policy. For this policy, the only principal that can write to a file is Admin. To type this function, the type checker utilizes information about runtime tests to refine types. For example, in a first branch, to prove that true can be given the type {b:bool|b=true⇒CanWrite p f}, the assumption p=Admin (derived from the result of the pattern match) and the axiom Ax1 is passed to the Z3 solver, which decides that CanWrite p f is valid.

Lines 18-19 show a client of the AC module, a function with three arguments: a principal name p, a credential c for p, and a file f. In order to call fwrite, the client needs to prove the proposition CanWrite p f. The client does so by calling check and calls fwrite if the check is successful. Again, the type checker uses the result of the runtime test to conclude that CanWrite p f is true in the then branch, and the call to fwrite type checks. A call to fwrite without the appropriate test (e.g., in the else-branch) results in a type error.

As another example of programming in FINE, an example fragment of a stateful authorization and information flow policy is modeled for use with LOOKOUT. A reference monitor, Lookout®, exposes an API for plugins to read and reply to emails and make appointments in a calendar. As described below, a user can specify policy rules to restrict the way in which a plugin can use Lookout®'s API; the code for a plugin is also shown below. A user may download .NET assemblies for a plugin, type check it against a policy using a lightweight syntactic checker, and only allow installation if the check succeeds.

With respect to security objectives, Lookout® provides a way to track information flow. A user can use information flow tracking to ensure, for example, that emails sent by a plugin never disclose information not meant for the recipient. Additionally, Lookout® models a stateful role and history-based authorization policy. This allows a user to organize contacts into roles, granting privileges to some principals but not others, and allows the user to change role memberships dynamically. The state of the policy also records events such as the sending of emails. A user can define a policy over these events, for example, to ensure that plugins never "spam" a user's contacts by responding to emails repeatedly.

Expressing and enforcing these security objectives uses various aspects of FINE's type system. Information flow policies are specified using dependent types, where the type of a secure object is indexed by a value indicating its provenance, that is, its origin. Stateful policies are specified by refining the type of the authorization state using logical formulas. For instance, a refinement formula may require the authorization state to record that a principal is in a specific role before a permission is granted. Also, changes to the state are modeled using affine types, which are closely related to linear types, with the distinction that affine variables can be used at most once, as described herein. By keeping affine types separate from refinement formulas, programming and the extraction of proof terms from the Z3 solver are simplified.

The following table sets forth a fragment of the Lookout® reference monitor for LOOKOUT:

```
1  module LookoutRM
2  open AC
3  private type email = {sender:prin; contents:string}
4  private type appt = {who:prin; starttime:date; endtime:date; note:string}
5  val mkEmail: prin → string → email
6  val sender: e:email → {p:prin | p=e.sender}
7  val mkAppt: prin → date → date → string → appt
8  (* Constructs for information flow tracking *)
9  type prov = E:email → prov | A:appt → prov | J:prov → prov → prov
10 private type tracked:: * → prov → * = Tag:α → p:prov → tracked
       α p
11 val fmap: (α → β) → p:prov → tracked α p → tracked β p
12 val popt: p:prov → tracked (option α) p → option (tracked α p)
13 (* Constructs for a stateful authorization policy *)
14 type role = User: role | Friend: role | Plugin: role
15 type att = Role: prin → role → att
16         | HasRepliedTo: prin → email → att
17 type st = list att
18 type action = ReadEmail: email → action
19         | ReplyTo: email → p:prov → tracked email p → action
20         | MkAppt: p:prov → tracked appt p → action
21 type perm = Permit: prin → action → perm
22 type In:: att → st → *
23 type Derivable:: st → perm → *
24 type dst<p:perm> = {s:st | Derivable s p}
25 (* An affine type to assert the validity of the authorization state *)
26 private type Statels:: st → A = Sign: s:st → Statels s
27 (* An API for plugins *)
28 val readEmail: p:prin → cred p → e:email →
29         s:dst<Permit p (ReadEmail e)> → Statels s →
30         (tracked string (E e) _ Statels s)
31 val mkAppt: p:prin → cred p → q:prov → a:tracked appt q →
32         s:dst<Permit p (MkAppt q a)> → Statels s → Statels s
33 val replyTo: p:prin → cred p →
34         orig:email → q:prov → reply:tracked email q →
35         s:dst<Permit p (ReplyTo orig q reply)> → Statels s →
36         (s1:{x:st | In (HasRepliedTo p orig) x} * Statels s1)
37 val installPlugin: u:prin → cred u → p:prin →
38         s:{x:st | In (Role u User) s} → Statels s →
39         (s1:{x:st | In (Role p Plugin) x} * Statels s1)
```

Lookout® allows plugins to read emails and aims to track information flow for any data that is derived from the contents of an email. At lines 3-4 of the above example, Lookout® defines the types email and appt, which corresponds to records that represent emails and appointments, respectively. To ensure that clients cannot directly inspect the contents of an email, email is made a private type. Lookout® includes a function, "mkEmail," to allow plugins to construct emails, and "sender," to allow a plugin to inspect the sender of an email. Note that in order to read the contents of an email, a plugin has to use "readEmail" (described below).

Information flow tracking in Lookout® is based on a scheme in which information flow policies are specified and enforced by tagging sensitive data with security labels that record provenance. At line 9, Lookout® defines the type prov (values of this type are used as security labels), and at line 10, the dependent-type constructor "tracked" provides a way of associating a label with some data. For example, tracked string (E x) will be the type of a string that originated from the email x. Note that tracked is defined as a private type. Client programs can only manipulate tracked values using functions that appear in the interface of Lookout®, e.g., fmap allows functions to be lifted into the tracked type. Several other functions can also be provided to allow client programs to work with the tracked datatype.

In the model of stateful authorization implemented by Lookout®, policies may be specified as inference rules that derive permissions from a set of basic authorization attributes. For example, the attributes may include assertions about a principal's role membership, and the policy may include inference rules that grant permissions to principals in certain roles. Over time, whether due to a program's actions or due to external events, the set of authorization attributes can change. For example, in order to access a resource, a principal may alter the state of the authorization policy by activating a role. In this state, the policy may grant a specific privilege to the principal. A subsequent role deactivation causes the privilege to be revoked.

In the above example, the set of basic authorization attributes in Lookout® is represented by the type st (lines 14-17). Attributes include values like Role (U "Alice") Friend to represent a role-activation for a principal, or values like HasRepliedTo p e to record an event that a principal p has sent an email in response to e. Permissions, comprising the relations derived using policy rules from the basic authorization attributes, are represented using the type perm. For example, Permit (U "Plugin") (ReadEmail e), represents a permission to read an email that a user may grant to a plugin. Line 22 shows a type In, a proposition about list membership, e.g., In a s is a proposition that states that a is a member of the list s. The proposition Derivable s p (line 23) is used to assert that a permission p is derivable from the collection of authorization attributes s. The type abbreviation dst<p> refines the state type st to those states in which the permission p is derivable.

With respect to affine types for state evolution, the type constructor StateIs at line 26 addresses two aspects. A value of type StateIs s represents an assertion that s contains the current state of authorization facts. Lookout® uses this assertion to ensure the integrity of its authorization facts; StateIs is declared private, whereby untrusted clients cannot use the Sign constructor to forge StateIs assertions. Moreover, since the authorization state can change over time, FINE's type system provides a way to revoke StateIs assertions about stale states. For example, after a principal p has responded to an email e, the fact HasRepliedTo p e may be added to the set of authorization facts s. At that point, the assertion StateIs s may be revoked, and StateIs ((HasRepliedTo p e)::s) asserted instead.

Types in FINE may be classified into two basic kinds, *, the kind of normal types, and A, the kind of affine types. Declaring StateIs::st→A indicates that StateIs constructs an affine type from an argument of type st. When the state of the authorization policy changes from s to r, Lookout® constructs a value Sign r to assert StateIs r, while destructing a StateIs s value to ensure that the assertion about the stale state s cannot be used again.

Lines 28-39 define the API that Lookout® exposes to plugins. Each function requires the caller p to authenticate itself with a credential cred p. Using the refined state type dst<p>, the API ensures that each function is only called in states s where p has the necessary privilege. For example, in order to read the contents of an email e, the readEmail function requires ReadEmail p e to be derivable in the state s. To ensure that information flows are tracked on data derived from an email, readEmail returns the contents of e as a string tagged with its provenance, i.e., the label E e. To indicate that the authorization state s has not changed, readEmail also returns a value of type StateIs s. The mkAppt function allows p to make an appointment a only in states s where p has the MkAppt permission. The type of a indicates that its provenance is q, and, like readEmail, mkAppt leaves the authorization state unchanged. As exemplified below, a user can grant a plugin permission to make an appointment a depending on a's provenance.

The function "replyTo" allows a plugin p to send a reply with provenance q to an email orig when the ReplyTo orig q reply has been granted to p. Unlike the other functions, replyTo modifies the authorization state to record a HasRepliedTo p orig event. The return type of replyTo is a dependent pair comprising a new list of authorization attributes s1, and an assertion of type StateIs s1 to indicate that s1 is the current authorization state. Also described is a function "installPlugin" that allows a user u to register a plugin p.

The following table shows an example user's policy and fragment of plugin code in a module "UserPolicy" that configures the behavior of the Lookout® reference monitor with several user-provided policy assumptions:

```
1  module UserPolicy : LookoutRM
2  let init = let a = [Role (U "Alice") Friend; ... ] in (a, Sign a)
3  assume U1: forall (p:prin) (e:email) (s:st).
4      In (Role p Plugin) s && In (Role e.sender Friend) s⇒
5      Derivable s (Permit p (ReadEmail e))
6  assume U2: forall (p:prin) (e:email) (a:tracked appt (E e)) (s:st).
7      In (Role p Plugin) s && In (Role e.sender Friend) s⇒
8      Derivable s (Permit p (MkAppt (E e) a))
9  assume U3: forall (p:prin) (e:email) (reply:tracked email (E e)) (s:st).
10     In (Role p Plugin) s && not (In (HasRepliedTo p e) s)⇒
11     Derivable s (Permit p (ReplyTo e (E e) reply))
12 end
13 open LookoutRM
14 (* Utility functions for checking authorization attributes *)
15 val checkAtt: s:st → r:attr → fb:bool | (b=true⇔In r s)g
16 let rec checkAtt s r = match s with
17   | [ ] → false
18   | a::tl → if r=a then true else check tl r
19 (* Custom plugin logic *)
20 val detectAppt: prin → string → option appt
21 val mkNotification: appt → email
22 (* Type abbreviation for the current set of authorization facts s *)
23 type state = (s:st * StateIs s)
24 val processEmail: p:prin → cred p → email → state → state
25  let processEmail p c em (s, tok) =
26   let c1 = checkAtt s (Role p Plugin) in
27   let c2 = checkAtt s (Role (sender em) Friend) in
28   let c3 = checkAtt s (HasRepliedTo p em) in
29   if c1 && c2 && not c3 then
30       let (pstr, tok) = read_email p c em s tok in
31       let opt appt = fmap (detectAppt (sender em)) (E em) pstr in
32       match popt (E em) opt_appt with
33         | None → (a, tok) (* no appointment extracted; do nothing *)
34         | Some appt →
35             let tok = mkAppt p c (E em) appt s tok in
36             let reply = fmap mkNotification (E em) appt in
37                replyTo p c em (E em) reply s tok
38 else (s,tok) (* can't read email, or already sent notification *)
```

Line 2 shows init, the initial collection of authorization attributes. The user includes facts such as the roles of friends in a list a, and, using the data constructor Sign, attests that a is the authorization state. The Sign data constructor needs the privilege of the Lookout® module—FINE's module system allows this privilege to be granted to UserPolicy using the notation "module UserPolicy: Lookout®". The assumptions U1-U3 show how permissions can be derived from attributes. Assumption U1 allows a plugin to only read emails from friends. U2 allows a plugin to make an appointment a, only if the provenance of a is an email e that was sent by a friend. U3 allows a plugin to reply to an email e only if a reply has not already been sent. Moreover, the reply should only contain information derived from the original email, ensuring that plugins do not leak emails from one contact to another. Note that more elaborate information flow constraints may be specified.

The utility function checkAtt on lines 15-18 is a standard tail-recursive membership test on a list, and allows the authorization state to be queried. Type-checking checkAtt uses standard axioms about list membership specified using the proposition "In."

The remainder of the above example shows fragments from a plugin program. The processEmail function is meant to extract an appointment from an email, update the calendar with the appointment, and send an automated reply. It relies on two functions, "detectAppt" and "mkNotification," which implement some plugin-specific logic.

The type of processEmail shows its arguments to be a credential c of type cred p, the email em that is to be processed, and the current authorization state (s, tok):state. This is a pair comprising the set of authorization attributes s, and a token, tok:StateIs s, asserting the integrity and validity of s. Lines 26-28 show several checks on the authorization state to ensure that p has the privilege to read em and to send a response. If the authorization check fails, the plugin does nothing and returns the state unmodified. Otherwise, at line 30, the plugin reads em and obtains pstr:tracked string (E em). It uses fmap and popt to try to extract an appointment from the email in a manner that tracks provenance. If an appointment was found, the plugin makes an appointment and sends a reply.

Programming with affine types can be difficult at times, because affine variables can never be used more than once. The approach of using an affine assertion StateIs s to track the current authorization state reduces the difficulty. Significantly, the collection of authorization facts s is itself not affine and can be freely used several times; e.g., s is used in several calls to checkAtt. Non-affine state also enables writing functions like checkAtt, which, if s was affine, destroys the state of the program. Only the affine token, tok:StateIs s, need be used with care, to ensure that it is not duplicated.

Non-affine refinement formulas simplify automated proofs. In this example, the FINE type checker uses the Z3 solver to synthesize proof terms for the proof obligations. By ensuring that refinement formulas apply to non-affine values, the proof system is kept tractable. Note that combining dependent and affine types allow refinements to apply to affine values, necessitating an embedding of linear logic in Z3. As described herein, this is avoided, while retaining the ability to refine the changing state of a program with logical formulas.

Affine types also ensure purity, in that, for example, detectAppt is a pure function that cannot cause side effects by calling functions like replyTo, or mkAppt. For example, fmap reveals the contents of an email as a string (rather than a tracked string p) to detectAppt, however detectApp cannot subvert the information flow policy by sending the string in an email (a side effect) because of the type system. Note that in order to call replyTo, a caller has to pass an affine StateIs s token as an argument. These tokens serve as capabilities that permit the caller to cause side effects, such as sending emails. The types of detectAppt and mkNotification ensure that these values do not have access to any such capabilities; capabilities are affine and expressions that capture affine values need to themselves be affine.

The following table illustrates the syntax of FINE in one example implementation:

| | | | |
|---|---|---|---|
| principals | p, q, r | ::= | $\rho$ \| T \| $\bot$ |
| terms | e | ::= | x \| D \| $\lambda$x:$\tau$.e \| $\Lambda\alpha$::$\kappa$.e |
| | | \| | fix f:$\tau$.e \| $e_1\ e_2$ \| e$\tau$ \| $\langle e \rangle_p$ |
| | | \| | match $v_p$ with D $\vec{\tau}\ \vec{x} \to e_1$ else $e_2$ |
| types | $\tau$, $\phi$ | ::= | $\alpha$ \| x:$\tau_1 \to \tau_2$ \| $\forall\alpha$::$\kappa$.$\tau$ |
| | | \| | T \| $\tau_1\ \tau_2$ \| $\tau$ e \| $\{$x:$\tau$\|$\phi$ $\}$ \!$\tau$ |
| kinds | $\kappa$ | ::= | * \| A \| * $\to$ $\kappa$ \| A $\to$ $\kappa$ \| $\tau \to \kappa$ |
| signature | S | ::= | T::$\kappa$ \| D:(p, $\tau$) \| p$\sqsubseteq$ q \| S, S \| . |
| type env. | $\Gamma$ | ::= | $\alpha$::$\kappa$ \| x:(p, $\tau$) \| $v_p \doteq v_{p'}$ \| $\Gamma$, $\Gamma'$ \| . |
| pre p-values | $u_p$ | ::= | x \| D $\vec{\tau}\ \vec{v}$ |
| p-values | $v_p$ | ::= | $u_p$ \| $\lambda$x:$\tau$.e \| $\Lambda\alpha$::$\kappa$.e \|$\langle u_q \rangle_q$ |

As can be seen, source terms are annotated with the names of principals, ranged over by the metavariables p, q, r. Principals in this formalization correspond to module names, and expressions granted the privilege of p are allowed to view the types defined in module p concretely; other principals view p's types abstractly. A principal constant is denoted p, and two distinguished principals are included: T includes the privileges of all other principals, and $\bot$ has no privileges. The term language is standard for a polymorphic lambda calculus with data constructors D and a pattern matching construct. The form $\langle e \rangle_p$ represents an expression e that has been granted p-privilege. Types $\tau$ include dependent function types (pi types) x: $\tau \to \tau'$, where x names the formal parameter and is bound in $\tau'$. Polymorphic types $\forall\alpha$::$\kappa$. $\tau$ decorate the abstracted type variable $\alpha$ with its kind $\kappa$. Type constructors T can be applied to other types using $\tau_1\ \tau_2$ or terms using $\tau$ e. Refinement types are written $\{$x:$\tau$|$\phi\}$, where $\phi$ is a type in which x is bound. An affine qualifier can be attached to any type using !$\tau$. Types are partitioned into normal kinds * and affine kinds A. Type constructors can construct types of kind $\kappa$ from normal types (*$\to\kappa$), affine types (A$\to\kappa$), or terms of type $\tau$ ($\tau\to\kappa$).

FINE programs are parametrized by a signature S, a finite map which, using T::$\kappa$, ascribes a kind to a type constructor T. The notation D:(p, $\tau$) associates a principal name p and type $\tau$ with a data constructor. This gives D the type $\tau$ and limits its use to programs 'with p-privilege. The signature also records relations between principals p$\sqsubseteq$ q, to indicate that q includes the privileges of p. For example, the Sign constructor described above is represented in this notation as Sign:(Lookout®, a:st$\to$StateIs a), and indicates that it is a data constructor which needs the privilege of the Lookout® module. The notation "module UserPolicy: Lookout®" is represented as the relation Lookout®$\sqsubseteq$ UserPolicy, which grants the UserPolicy module the privilege to use the Sign constructor. Axioms introduced via the assume construct are represented as data constructors.

The typing environment $\Gamma$ records the kind of type variables. As with data constructors in the signature, variables x are associated with both their type $\tau$ and a principal name p. The assumption $v_p \doteq v'_p$ records the result of pattern matching tests and is used to refine types.

Values in FINE are partitioned into families corresponding to principals. A pre-value for code with p-privilege is either a variable, or a fully-applied data constructor. Values for p are its pre-values, abstractions, or pre-values $u_q$ for some other principal q, delimited within angle brackets to denote that $u_q$ carries q-privilege. Dynamic semantic tracks the privilege associated with an expression using these bracket delimiters. This allows us to prove that programs without p-privilege view p-values abstractly.

Figure 2:
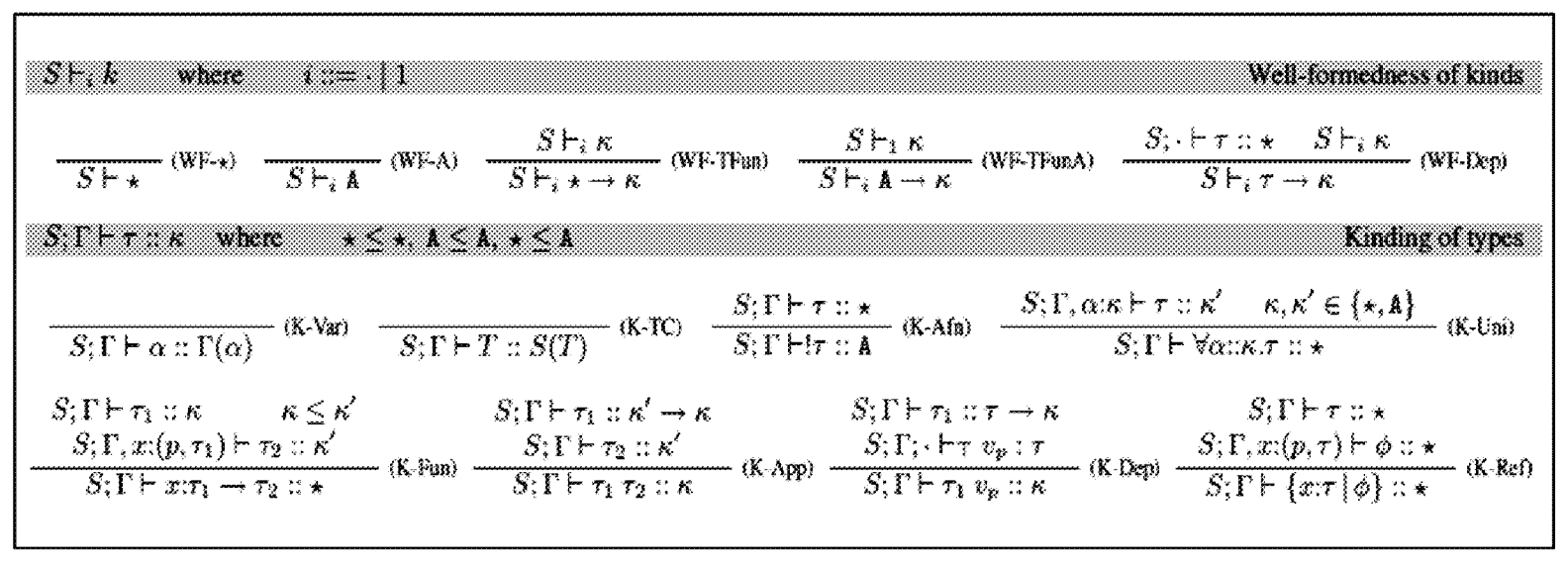
Figure 3:
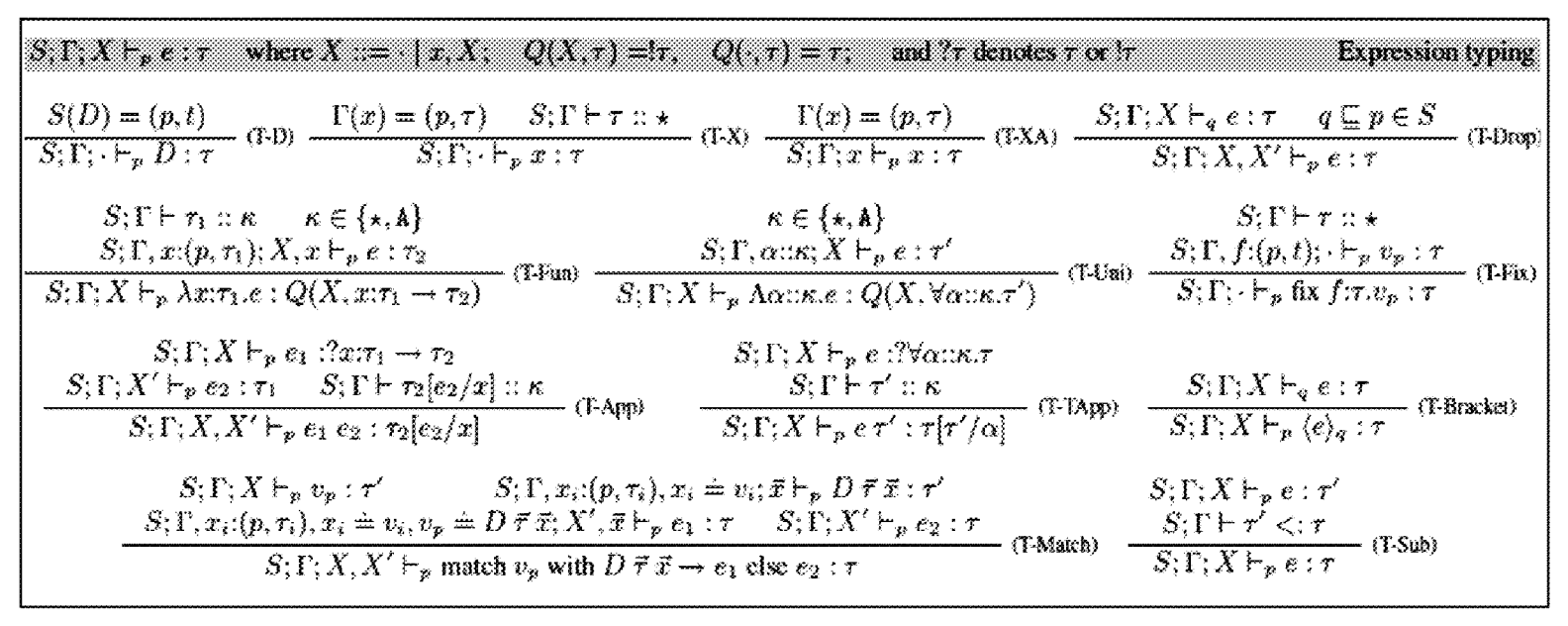
Figure 4:
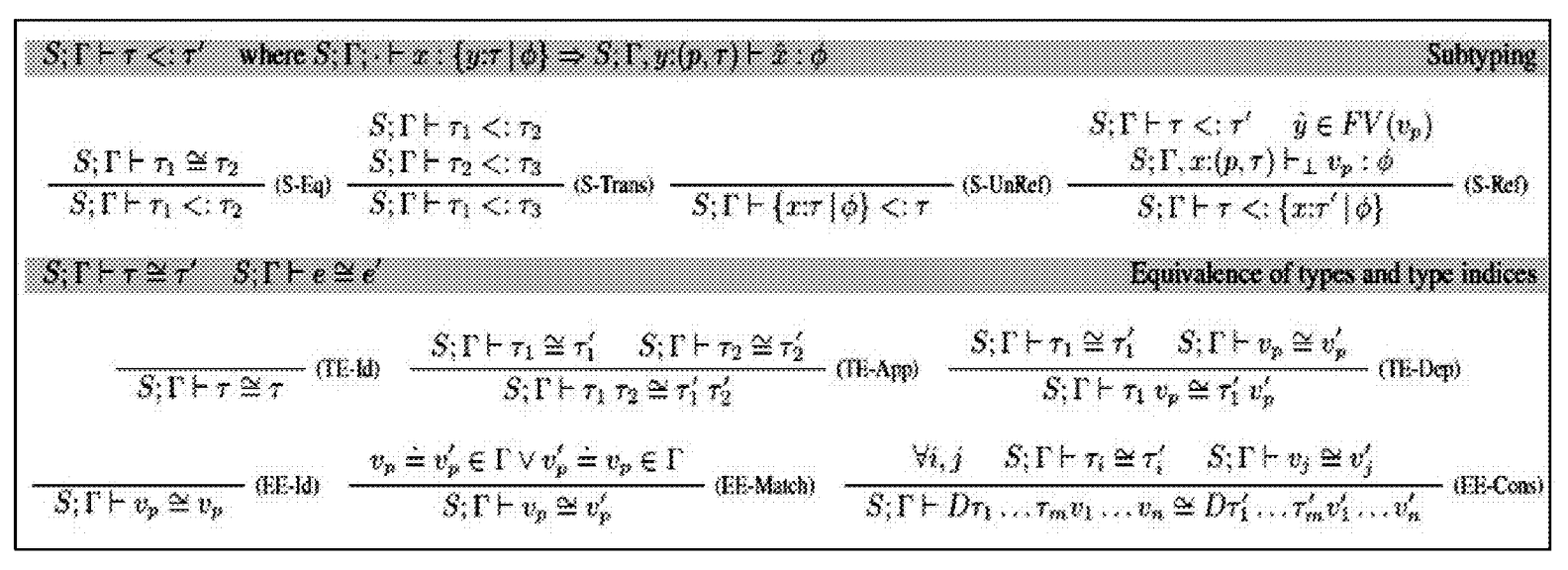

FIGS. 2-4 show static semantics of FINE. The first judgment $S \vdash_i \kappa$ defines a well-formedness relation on kinds. Types constructed from affine types are themselves affine, as is standard. To enforce this property, the judgment is indexed using i::=·|1, and when checking a kind A→κ, κ is needed to finally produce an A-kinded type. The second restriction, enforced by (WF-Dep), ensures that only non-affine values appear in a dependent type.

The judgment S; Γ⊢τ::κ states that τ can be given kind κ. Types that are inhabited by terms are given either kind * or A, and in (K-Fun), the type $\tau_1$ of a function's parameter has kind * or A. Additionally, functions that take affine arguments produce affine results. These two constraints are captured using an auxiliary relation on kinds, κ≤κ'. In (K-Uni) abstraction is allowed only over * and A-kinded types. (K-Afn) rules out "doubly-affine" types (!!τ). (K-Ref) specifies that refinement formulas φ are non-affine.

The rule that checks the well-formedness of dependent types, (K-Dep), has two elements. First, type-level terms are restricted to be values, e.g., Eq (+1 2) 3 is not a well-formed type, even with Eq::int→int→* . This simplifies the metatheory while limiting expressiveness. A second premise of (K-Dep) makes use of a typing judgment, as described below.

The typing judgment is written S; Γ; X⊢$_p$ e:τ, and states that an expression e, when typed with the privilege of principal p in an environment Γ and signature S, can be given the type τ. The set X records a subset of the variable bindings in Γ, and each element of X represents a capability to use an assumption in Γ.

The rule (T-D) requires data constructors declared to be usable only by code with p-privilege to be used in a context with that privilege. In the second premise of (T-Match), a pattern D $\vec{\tau}$ $\vec{x}$ is type checked to ensure that data constructors are also destructed in a context with the appropriate privilege.

In (T-X), a non-affine variable x is typed by looking up its type in the environment. (T-XA) allows an affine variable to be used only when a capability for its use appears in X. Unlike in linear typing, affine assumptions need not always be used. (T-Drop) allows an arbitrary number of assumptions X' to be forgotten, and for e to be checked with a privilege q that is not greater than privilege p that it has been granted. An expression is granted privilege by enclosing it in angle brackets, as shown in (T-Bracket).

Returning to the second premise of (K-Dep), a type-level term $v_p$ is checked with the privilege of ⊤. The intuition is that type-level terms have no operational significance and, as such, cannot violate information-hiding. The term $v_p$ is also checked in (K-Dep) with an empty set of capabilities X. According to (WF-Dep), no well-formed type constructor can be applied to an affine value, so a type-level term like term $v_p$ never uses an affine assumption.

In (T-Fun), a check is made that the type of the formal parameter is well-formed, and the body type checked in an extended context. The privilege p of the program point at which the variable x was introduced is recorded to ensure that x is not destructed in unprivileged code in the function-body e. In the conclusion of (T-Fun), the auxiliary function Q(X; τ) is used, which attaches an affine qualifier to τ if the function captures any affine assumptions from its environment. (T-Uni) is similar. In (T-Fix), fixed variables f need to be given non-affine types, and for the recursive expression to not capture any affine assumptions.

When typing an application $e_1$ $e_2$ in (T-App), $e_1$ is allowed to be a possibly affine function type. The shorthand ?τ captures this, and the same notation in is used (T-TApp). In (T-App) the affine assumptions are split among the sub-terms, and, in the third premise, require the well-formedness of $\tau_2[e_2/x]$, which ensures that non-values never appear in types as the result of an application.

In (T-Match), the affine assumptions are split between $v_p$ and the branches. In the second premise, the pattern is type checked and bindings derived for each pattern-bound variable $x_i$. Constructed types in FINE are a form of generalized algebraic datatype. Equalities among types as a result of a pattern match are not induced, however, equality assumptions are recorded among values that appear in the type τ' of the discriminated expression (if any) and the pattern bound variables. These are shown as the $x_i \doteq v_i$ assumptions in the second premise. The truebranch $e_1$ is checked with an additional assumption that records the result of the successful pattern match. To illustrate using an example from above, if the discriminated expression $v_p$ has type τ'=tracked string (E mail), and the pattern is Tag string x y, the assumptions x:(p; string), y:(p; prov), and y$\doteq$(E mail) are included when typing the pattern in the second premise. When typing the true branch, also recorded is $v_p \doteq$ Tag string x y in Γ.

A transitive subtyping relation S; Γ⊢τ<:τ' is included, which does not include any structural rules, e.g., contra- and covariant subtyping in function types. The type system of CIL uses nominal subtyping, and structural rules of this form are not easily translated. Coercions can be used to represent a richer subtyping relation, if necessary.

The rule (S-UnRef) treats a refined type {x:τ}|φ} as a subtype of the underlying type τ. (S-Ref) allows a type τ to be promoted to a refined type {x:τ'|φ(x)} when τ is a subtype of τ', and when a proof of the formula φ(x) can be constructed in context Γ extended with a binding for x. (S-Ref) shows the proof term generated non-deterministically as a value $v_p$. Proof terms are typed with ⊥-privilege and thus can only use the public data constructors of every module in scope. For each variable y bound to a refined type type {x:$\tau_1$|$\phi_1$(x)} in the environment, let ŷ denote a proof of the formula $\phi_1$(x). The premise ŷ ∈ FV($v_p$) indicates that $v_p$ makes use of other proof terms ŷ from the context. These proof terms are synthesized using an external prover (Z3) and type checked in FINE. Subtyping includes an equivalence relation on types S; Γ, ⊢τ≡τ'.

The rule (EE-Match) allows a type-level term $v_p$ to be equated with $v'_p$ when an assumption $v_p \doteq v_p'$ appears in the context.

FIG. 5 shows dynamic semantics in the form of rules from small-step operational semantics for FINE. The operational semantics of FINE places affinely typed values in a memory M. Reads from the memory are destructive, which allows us to prove that in well-typed programs, affine values are never used more than once. The semantics also tracks the privilege of expressions by propagating brackets through reductions. This allows proving an information-hiding property for a module system. The main judgment is written (M, e) ♪$_p$(M', e'), and states that given an initial memory M an expression e steps to e' and updates the memory to M'. The p-superscript indicates that e steps while using the privilege of the principal p.

As seen in FIG. 5, evaluation contexts define a standard left-to-right, call-by-value semantics. As for values, evaluation contexts $E_p$ are divided into families corresponding to principals. Note that other rules include congruences that allow reduction under a context, standard beta-reduction for type and term applications, unrolling of fixed points, and pattern matching.

Reduction rules that do not involve reading from memory are written as e $\rightarrow_p$ e'. The rules that manage privileges and brackets fall into this fragment. Redundant brackets around p-values can be removed using (E-Strip). However, not all nested brackets can be removed, as (E-Nest) shows. In (E-Ext), a λ-binder is extruded from a function with q-privilege so that it can be applied to a p-value. Occurrences of the bound variable in e are enclosed within p-brackets, to ensure that e treats its argument abstractly. (E-TExt) extrudes a Λ-binder. Since type-level terms are checked with T-privilege, there is no need to enclose α in p-brackets. (E-Br) allows evaluation to proceed under a bracket $\langle \cdot \rangle_q$ with q-privilege.

The rules in the semantics that manipulate the store are (E-Construct) and (E-Destruct). (E-Construct) allocates a new location x for an affine value $v_p$ into the store M, non-deterministically, and replaces $v_p$ with x. When a location x is in destruct position, (E-Destruct) reads a value $v_p$ from M and deletes x.

FINE's module system provides two general purpose security properties, including value abstraction, which corresponds to a secrecy property. A program e without p-privilege cannot distinguish p-values. An integrity property is also provided, namely that a program without p-privilege cannot manufacture a p-value to influence the behavior of code with p-privilege.

Type soundness and these general-purpose security properties provide a set of primitives by which application-specific security properties can be proved. For example, applying type soundness and security theorems to Lookout®, it is straightforward to show (with suitable type-correct implementations of the functions in Lookout®'s API) that state updates are modeled accurately. Specifically, a reduction sequence of any program using Lookout® will never use more than a single memory location of type StateIs s, for any s. Additionally, the mechanism for information-flow tracking accurately accounts for dependences.

The compiler extracts proofs of refinement formulas from the Z3 solver as typeable FINE proof terms, and performs derefinement translation of source programs. The result of this translation is a FINE program in which all values v given a refinement type {x:τ|φ} are replaced (to a first approximation) with pairs of the form (x:τ * proof φ), i.e., dependent pairs containing the value v and a proof term that serves as evidence for the refinement formula φ. This approach removes the prover from the TCB, and enables a translation to a target language DCIL, as described below, At the source level, the compiler interprets user-provided assumptions and the types φ that appear in refinements {x:τ|φ} as formulas in a classical first-order logic. To give a value v a refined type, the Z3 solver is presented with a theory with the user axioms, equality assumptions accumulated in the context, and the negated formula ¬ φ{v/x}}. If Z3 can refute the formula, it produces a proof trace. A known approach translates the proof traces reported by Z3 into proof terms in FINE.

The proof system in FINE axiomatizes a classical first-order logic with equality by defining an abstract datatype proof::*→*. Inference rules of the logic and user-provided axioms are represented using data constructors for the proof type. Logical connectives in formulas are represented using type constructors, e.g., And::*→*→*, Not::*→*, and quantified formulas are represented using the binding constructs provided by dependent function types. A selection of the constructors in the kernel of the proof system are shown below. These include inference rules and constructors that allow proof terms to be composed monadically. Also shown is the translation of the user axiom Ax1 (described above).

```
T: proof True
Contra: proof (not α) → proof α → proof False
Destruct false: proof False → proof α
Bind_pf: proof α → (α → proof β) → proof β
Ax1: proof (f:file →proof (CanWrite Admin f))
```

In addition to the core inference rules, proof principles are generated for a first-order treatment of equality. A more compact higher-order treatment of equality is not possible, since the target language does not support quantification over types with higher-order kinds. For example, for the prin type defined above, a type Eq_prin corresponding to equality for prin values is automatically generated, along with substitution principles relating Eq_prin to other propositions in the program. Some of the auto-generated types and axioms are shown below.

```
type Eq_prin:: prin → prin → *
Refl_Eq_prin: p:prin → proof (Eq_prin p p)
Mono_CanWrite: p1:prin → p2:prin → proof (Eq_prin
  p1 p2) → f:file → proof (CanWrite p1 f) → proof (CanWrite p2 f)
```

By way of example, consider the check function from module AC described above. In order to type check its return value, the validity of CanWrite p f needs to be proven in a context that includes the assumption p=Admin and the Ax1 axiom. Z3 proofs may be directly translated into corresponding FINE terms. For example, Z3 proofs often end with applications of the Contra and Destruct false rules, even when these are not necessary.

```
(Mono_CanWrite Admin p (Refl_eq_prin p)
   (Bind_pf (x:file → proof (CanWrite Admin x))
      (CanWrite Admin f)
      Ax1 (λg: f0:file → proof (CanWrite Admin f0). g f))))
```

The sub-term Refl_eq_prin p can be given the type Eq_prin Admin p in a typing context that includes an assumption p=Admin (using the (TE-App) and (EE-Match) rules).

FINE includes recursion, and thus this proof system may not be logically consistent. However, the type soundness and value abstraction properties guarantee that proof terms are constructed using only the data constructors from the proof system and the user-supplied axioms, and that if a proof term has a normal form, then that normal form has the desired type. As a defense against clearly incorrect proofs, a simple syntactic check may be implemented to ensure that values of the proof α type are constructed in a recursion-free fragment of FINE (and also DCIL).

As described above, the compiler normalizes the type structure of FINE programs so that every type is of the form {x:τ|φ}, where both τ and φ are unrefined types. Note that a type can be put in this form. After type checking and generating proof terms for all refinement formulas, the refinement types are replaced with dependent pair types, i.e., the translation [[·]] of a normalized type {x:τ|φ} is the type (x:[[τ]] * proof [[φ]]). In other words, the translation "boxes" every τ-value with a proof term for a refinement formula. The uniform structure of a derefined program simplifies the translation and allows properly accounting for proof and non-proof values by distinguishing the kind of boxed types from unboxed types. However, this representation is inefficient and has to insert code to unbox a value by projecting out its non-proof component when a boxed value appears in destruct position. An optimization pass to remove redundantly boxed terms is straightforward and can be used to give fwrite the type:

fwrite:p:prin→cred     p→f:file→proof(CanWrite p f)→string→unit

Turning to DCIL, DCIL extends CIL with affine types, type-level functions, and classes parameterized by values. Code consumers can choose to use a type checker for DCIL for security checking, but otherwise can run FINE programs on conventional virtual machines.

The below table shows the syntax of DCIL, reusing meta-variables from FINE for syntactic categories in DCIL:

| module | mod. | ::= | {tdcl, ddcl in e} |
| abs. class | tdcl | ::= | $T\langle \vec{\alpha}::\vec{\kappa}, \vec{x}:\vec{\tau}\rangle::\kappa\{\overline{fdcl}, \overline{mdcl}\}$ |
| data class | ddcl | ::= | $D\langle \vec{\alpha}::\vec{\kappa}, \vec{x}:\vec{\tau}\rangle:T\langle \vec{\tau}, \vec{v}\rangle \{\overline{vc}, \overline{fdcl}, \overline{mdcl}\}$ |
| constraints | vc | ::= | x = v |
| fld. decl. | fdcl | ::= | f:τ |
| meth. decl. | mdcl | ::= | $\tau\, m\langle\alpha::\kappa\rangle(x:\tau)\{e\}$ |
| value | v | ::= | $x \mid D\langle \vec{\tau}, \vec{v}\rangle$ |
| expr. | e | ::= | $v \mid D\langle \vec{\tau}, \vec{v}\rangle \mid v \cdot f \mid v \cdot m\langle\tau\rangle(v)$ |
| | | | $\mid$ x isinst $D\langle \vec{\tau}, \vec{v}\rangle$ then $e_t$ else $e_f$ |
| | | | $\mid$ let x = $e_1$ in $e_2$ |
| type | τ | ::= | $\alpha \mid T\langle \vec{\tau}, \vec{v}\rangle \mid !\tau \mid \lambda x:\tau_1 \cdot \tau_2 \mid \tau\, v$ |
| kind | κ | ::= | $* \mid A \mid \tau \rightarrow \kappa$ |

Modules in FINE are translated to modules in DCIL, with visibility qualifiers used to model information-hiding in DCIL (visibility qualifiers are omitted in the above table). The types in FINE are translated to abstract classes T. FINE values v:τ are translated to instances of data classes D, where D extends T, the class corresponding to τ. Classes are parameterized by a list of type parameters $\vec{\alpha}::\vec{\kappa}$ and also by a list of value parameters $\vec{x}:\vec{\tau}$. Classes include field and method declarations, as usual. Data classes include value constraints $\vec{vc}$, which are analogous to FINE's pattern matching assumptions.

Expressions in DCIL include let-bindings. Expressions also include values v (variables or instances of data classes D), field projections, method calls, and a runtime type-test construct, (v isinst $D\langle \vec{\tau}, \vec{v}\rangle$ then $e_t$ else $e_f$), used to translate pattern matching. As in FINE, $\langle e\rangle_p$ records the privilege of e to be module p. Let-bindings and type-tests are macro instructions in DCIL; each corresponds to several CIL instructions.

Types include type variables and fully-instantiated abstract classes $T\langle \vec{\tau}, \vec{v}\rangle$. Affine types are written !τ, as in FINE. DCIL includes a restricted form of type-level function \x:τ₁·τ₂ to represent dependent types. Type-level function application is denoted τ v. The kind language in DCIL includes * and A to categorize normal and affine types, respectively, and τ→κ, the kind of type-level functions.

DCIL includes three features; first, in addition to *-kinded type parameters, classes in DCIL can include affine type parameters, type-function parameters and value parameters. Value parameters can be represented using standard field declarations, and type functions can be encoded using custom attributes. Note that DCIL does not include type parameters of kind *→κ or A→κ even though these kinds appear in FINE. Uses of these kinds in FINE may be translated using parametrized class declarations.

A second feature formalizes affine types and uses this to model stateful programming in FINE. The mixture of affine and dependent typing is subtle and can require tracking affine assumptions in types as well as terms. DCIL separates classes that represent source-level types (abstract classes $T\langle \vec{\tau}, \vec{v}\rangle$) from data classes ($D\langle \vec{\tau}, \vec{v}\rangle$). This separation ensures that affine values never appear in types, much as in the source language, simplifying the metatheory of DCIL. Affine types can be represented in CIL using .NET type modifiers. Affine type modifiers are opaque to the .NET runtime, and only need to be interpreted by a DCIL-aware bytecode verifier.

A third feature augments the declaration of data classes with value constraints. The body of a class D with a value constraint x=v is checked with the assumption that its field x holds values equal to v. When constructing an instance of such a class D, the values provided for these fields are checked that they satisfy the constraints.

Figure 6:
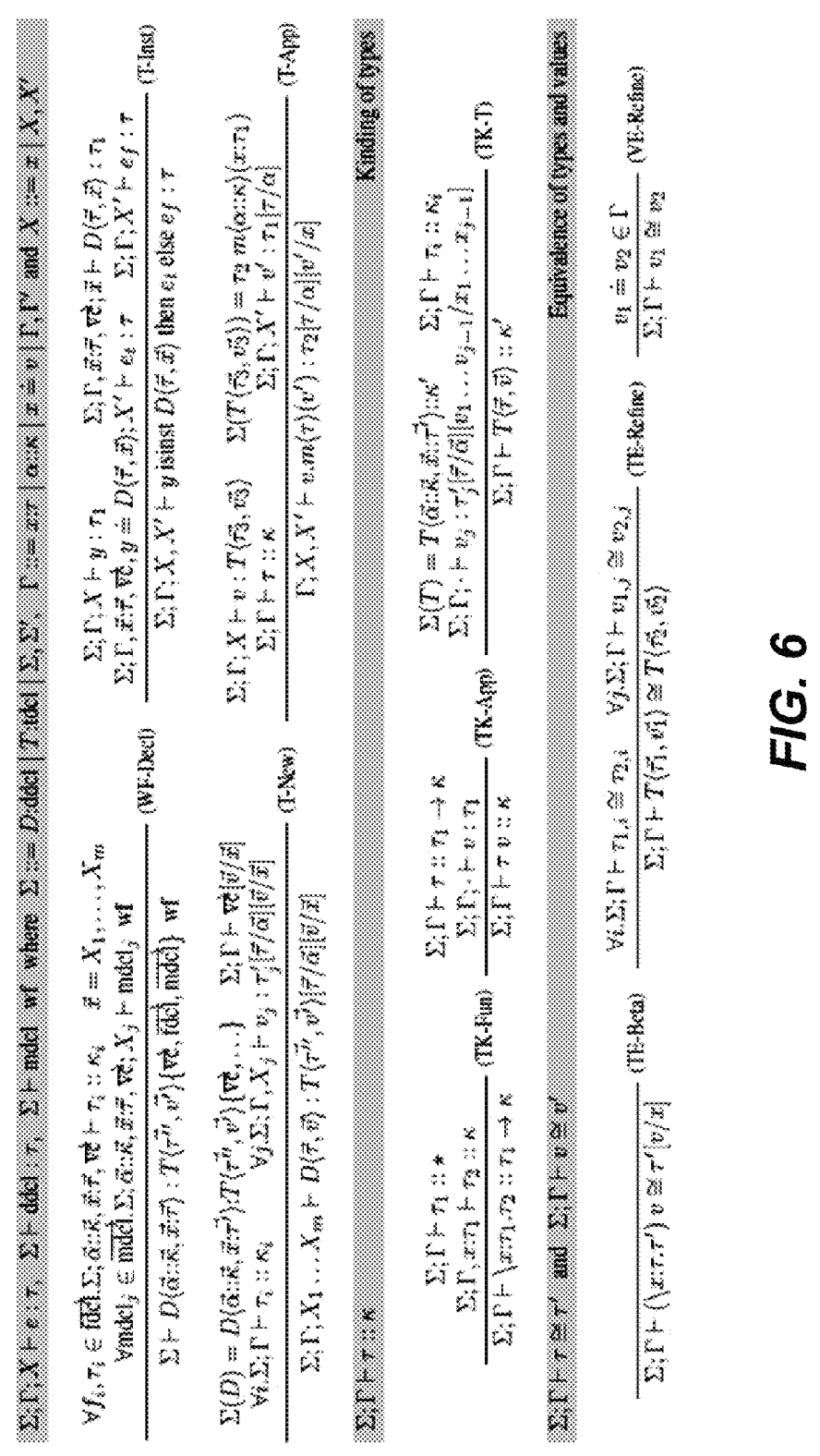

FIG. 6 shows elements from the static semantics of DCIL. The typing judgment uses Σ, a context that records the class declarations in scope, corresponding to the signature S in FINE; Γ, a typing environment with type variable and value variable bindings and equations resulting from runtime type-tests (as in FINE); and X, a subset of the variable bindings in Γ, corresponding to the set of affine capabilities in FINE. Expressions e are typed in the context of a module p, corresponding to source-level principals.

The rule (T-New) shows the typing rule for $D\langle \vec{\tau}, \vec{v}\rangle$, the constructor of a data class D with type parameters $\vec{\tau}$ and value arguments $\vec{v}$. A first premise looks up the declaration of class D in $\Sigma_p$, the restriction of the signature Σ to declarations visible in module p. A second premise checks that all value constraints are satisfied. A third premise checks that each type parameter has the kind expected by the declaration. A fourth premise checks each value argument $v_j$ with a subset of the affine assumptions $X_j$. The expected type of each $v_j$ is dependent on the type parameters $\vec{\tau}$, and the prefix of arguments $v_1 \ldots v_{j-1}$. $D\langle \vec{\tau}, \vec{v}\rangle$ is given a type of the form $T\langle \vec{\tau}, \vec{v}\rangle$ (with substitutions), where T is the abstract superclass of D. This ensures that affine variables never appear in DCIL types, simplifying the connection between the typing and kinding judgment.

The type and term application constructs in FINE are collapsed into a single method invocation construct in DCIL. The first two premises of (TT-App) check that v, the object on which the method is invoked, has a declaration for method m. The third and fourth premises check that the arguments to m have appropriate kinds or types, and the conclusion substitutes the actual type and term arguments in the return type $\tau_2$. DCIL's use of A-normal form ensures that non-values never escape into types.

A selection of the kinding rules are also shown in FIG. 6. (TK-Fun) ensures that the argument of a type function is non-affine, as with a similar restriction on kinds in the source language. (TK-App) and (TK-T) check type-function application and instantiations of abstract classes, respectively. Both rules show that type-level values are checked using an empty set of affine capabilities X. Although affine variables can appear in data class instantiations, the separation of data classes D from abstract classes T ensures that affine variables never escape into types. The semantics of DCIL also includes a type-equivalence judgment Σ; Γ⊢τ≡τ'. This is similar to the corresponding judgment in FINE, with the addition of a single rule that equates types related by β-reduction of type-function applications. Because DCIL does not contain refinement types, its semantics do not contain an analog of FINE's semantic sub-typing relation. Note that DCIL programs respect their visibility qualifiers, which is analogous to the value abstraction for FINE programs.

The following uses examples to show translation from FINE to DCIL in a manner that preserves types; the following table shows a DCIL program corresponding to a fragment of the FINE module AC program:

```
1  assembly AC {
2  public prin< >:: * { }
3  public U<s:string>:prin{string s;}
4  public Admin< >:prin{ }
5  public cred<p:prin>::* { }
6  internal Auth<p:prin>: cred<p> {prin p;}
7  public CanWrite<p:prin,f:file>::* { }
8  public Ax1<f:file>::CanWrite<Admin,f> {file f;}
9  public {write<...>:DepArrow<...>}
10
11 assembly Client f
12 (* client:p:prin!cred p → file!unit *)
13 public client< >:
14    DepArrow<prin,\p:prin.Arrow<cred<p>,Arrow<file, unit>>>
15    {Arrow<cred<p>, Arrow<file, unit>> App(p:prin) { clientp<p>;}}
16 (* (client p): cred p → file → unit *)
17 public clientp<p:prin>:Arrow<cred<p>, Arrow<file, unit>>
18    {Arrow<file, unit> App(c:cred<p>) f clientc<p,c>; }
19 (* (client p c):file → unit *)
20 public clientpc<p:prin, c:cred<p>>:Arrow<file, unit> {
21    unit App(f:file) {
22       p isinst Admin then
23          let pf = ... in (* translated proof term *)
24          let fwrite = AC.fwrite<...> in
25          fwrite.App(p).App(c).App(f).App(pf).App("hello")
26       else ( )}}
```

The type and data constructor declarations in a FINE module are accumulated as class declarations in a DCIL assembly, with visibility qualifiers used to capture source-level private types. Modules which are granted the privilege of other modules are placed within the same assembly, e.g., UserPolicy and Lookout®, are compiled to modules in a common assembly.

Type constructors are translated to declarations of abstract classes T. The type and value parameters of a type constructor are carried over directly. For example, the prin type is shown in the above example as an abstract class with no parameters. The dependent-type constructor cred::prin→* is translated (line 5) to an abstract class with a prin-typed value parameter.

Data constructors in FINE are translated to declarations of data classes D. Line 6 shows the data class corresponding to the Auth constructor from the AC module in FINE, which required the Auth constructor to only be usable by modules with AC-privilege. Thus, in DCIL, the Auth data class is qualified using the internal visibility qualifier. Data classes extend abstract classes that correspond to the result type of the source-level data constructor. The field declarations of a data class are in one-to-one correspondence with its value parameters, e.g., the prin p field of the Auth class. This correspondence is used to encode all value parameters in fields and do not require changing CIL. Note that user-provided assumptions are translated just as ordinary data constructors, e.g., Ax1 at line 10.

It is known how to translate (non-dependent) function types to a CIL-like language through the use of a polymorphic abstract class. This idea may be extended using type-level functions in DCIL to capture dependent function types. The translation uses the following declarations:

DepArrow⟨ $\alpha_1$::*, $\alpha_2$::$\alpha_1$→* ⟩ ::*{($\alpha_2$ x)App(x:$\alpha_1$){ }}

Class DepArrow takes two type parameters, namely $\alpha_1$ for the argument type and $\alpha_2$ for a type function. The return type of App is the result of applying $\alpha_2$ to the argument x. Source-level types such as p:prin→cred p are translated to instances of DepArrow; in this case, DepArrow⟨ prin\:prin. cred⟩ p⟩ prin. The abstract classes shown below represent non-dependent functions, and functions that take affine arguments or produce affine results; other combinations of kinds are unnecessary.

Arrow⟨ $\alpha_1$::*, $\alpha_2$::*⟩ ::*{($\alpha_2$)App(x:$\alpha_1$){ }}
Arrow_AA⟨ $\alpha_1$::A, $\alpha_2$::A⟩ ::*{($\alpha_2$)App(x:$\alpha_1$){ }}
DepArrow_A⟨ $\alpha_1$::*, $\alpha_2$::$\alpha_1$→A⟩ ::*{($\alpha_2$ x)App(x:$\alpha_1$){ }}

The source-level function client from module AC is a function with three arguments. Because client is curried, it is translated (lines 13-26) as three data class declarations. Each of the client data classes extends an instantiated DepArrow or Arrow class. The body of client simply calls the clientp version (by constructing it), and clientp calls clientpc.

The body of clientpc illustrates the translation of FINE expressions. The use of pattern matching at line 16 of module AC is translated to a type-test at line 22 of assembly AC. Line 23 shows a placeholder for the translation pf of the proof term of type proof<CanWrite<p,f>>. Line 24 obtains a reference to the fwrite value exposed by AC. After dereferencing, the type of fwrite is normalized to p:prin→cred p→f: file→CanWrite p f→string→unit, which in DCIL corresponds to the type:

```
DepArrow<prin,
   \p:DepArrow<cred p, \f: DepArrow<fille,
      Arrow<CanWrite<p, f>, Arrow<string, unit>>>>>
```

Line 25 of assembly AC shows the call to fwrite translated as successive calls to the App method. The proof term pf is passed as an extra argument, although this is not evident in the module AC source program. Because the source language does not provide a facility to extract a (proof φ)-typed value from an object of type {x:τ|φ}, proof-terms in DCIL may be computationally irrelevant. For efficiency, proof terms may be erased after the target code has been type checked. Alternatively, proof terms may be logged at runtime, if an application like evidence-based audit is to be supported, or, if running in a distributed setting, proof terms may be communicated between principals for proof-carrying authorization.

Polymorphic FINE types ∀α::κ.τ are translated to DCIL classes and type application to applications of polymorphic methods. In general, a well-typed FINE program is translated to a well-typed DCIL program.

Exemplary Operating Environment

Figure 7:
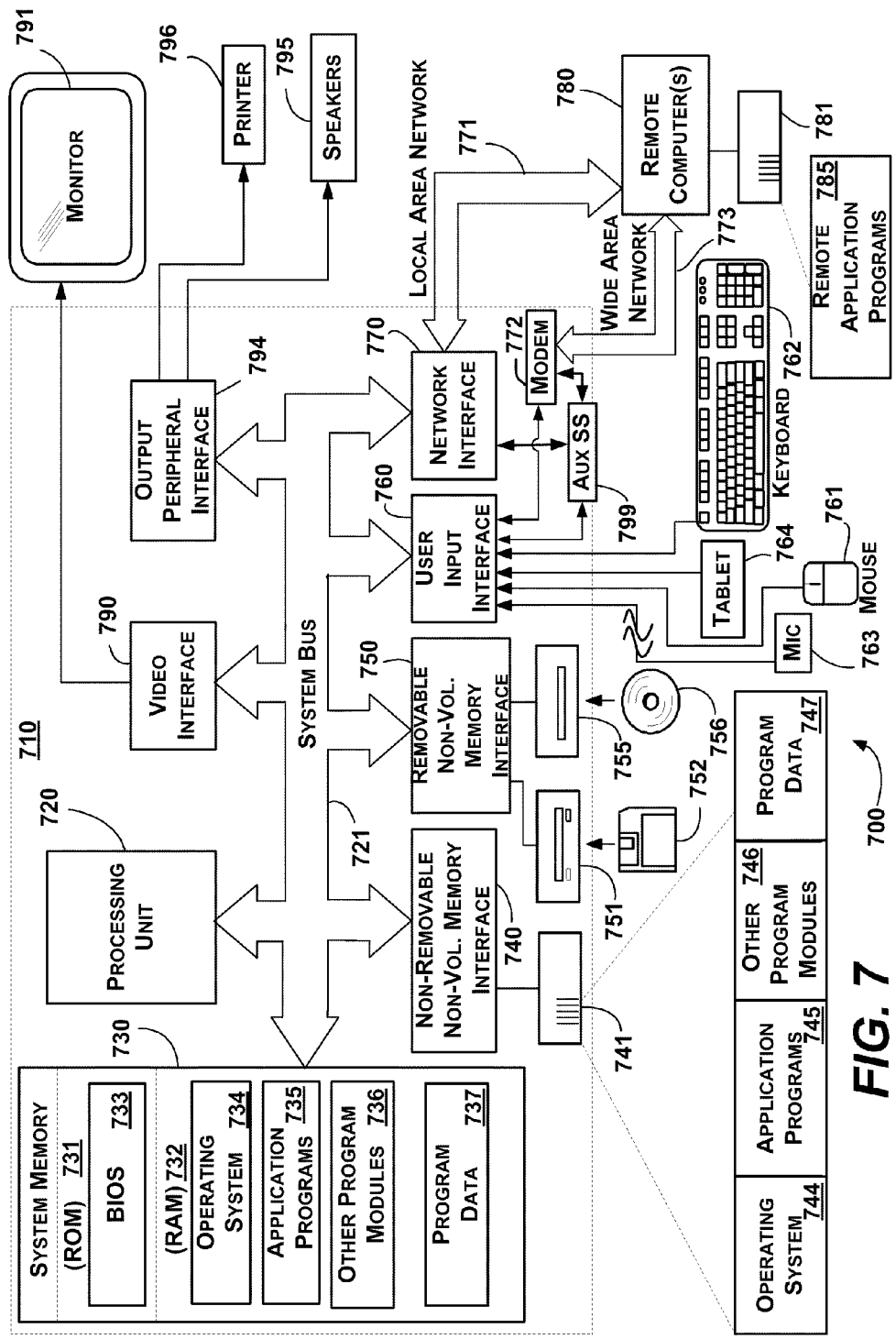
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
at least one processor; and
a memory communicatively coupled to the at least one processor; and
one or more software components stored on the memory comprising:
a compiler component to compile source program code written in a source language that integrates affine types with dependent types and refinement types,
wherein the compiler component further includes a type checker component coupled to a solver component to obtain proofs of refinement formulas from the solver component,
wherein the compiler component further to:
translate the source program code into target code having the proofs associated with the target code,
verify security policies, and
translate each value of a refinement type within the source program into a proof term of a corresponding refinement formula.

2. The system of claim 1, wherein the compiler component translates the source program code into target code associated with the proofs through replacement of each refinement type with a dependent pair comprising a value and proof.

3. The system of claim 2, wherein the target code preserves types used in the source program code, the types corresponding to the source language.

4. The system of claim 1, wherein the compiler component extracts proofs from the solver component as values.

5. The system of claim 1, wherein the target code comprises dependent common intermediate language corresponding to .NET code.

6. The system of claim 1, the compiler component further comprising a target code type checker component that verifies the target code with respect to the security policies.

7. The system of claim 1, wherein the solver component is internal or external to the compiler component.

8. The system of claim 1, wherein the target code comprises a plugin component.

9. A method employing at least one processor to perform steps, comprising:
compiling, via the at least one processor, source program code having refinement types, dependent types, and affine types that correspond to a state of an authorization policy,
wherein the compiling step further includes
extracting security proofs of refinement formulas from the source program code; and
translating the source program code into type-preserving target code,
wherein the translating step further includes replacing each refinement type with a dependent pair type that associates the security proofs with the target code.

10. The method of claim 9, wherein extracting the security proofs further comprises providing the source program code to a theorem prover that provides information to a compiler that compiles the source code.

11. The method of claim 9, wherein compiling the source program code further comprises type checking the source program code.

12. The method of claim 9, further comprises verifying the target code by performing type checking.

13. The method of claim 9, further comprising:
verifying that the target code complies with security policy; and
allowing installation of a verified program corresponding to the target code.

14. The method of claim 9, wherein replacing each refinement type further comprises placing the security proofs as values in the source program code.

15. The method of claim 9, wherein translating the source program code further comprises producing the type-preserving target code as code that corresponds to .NET common intermediate language runtime code.

16. The method of claim 9, wherein producing the type-preserving target code further includes providing type-level functions, classes parameterized by values, or affine types, or any combination of type-level functions, classes parameterized by values, or affine types.

17. One or more physical computer-readable storage media having computer-executable instructions, which when executed perform steps, comprising:

compiling source program code that has refinement types into a source program, wherein the compiling step further includes type checking the source program code, extracting security proofs of refinement formulas by communicating with a solver, and replacing each refinement type with security proofs comprising values in the source program code;

translating the source program into a target program; and type checking the target program to verify whether the target program complies with security policy.

18. The one or more physical computer-readable storage media of claim 17, wherein compiling the source program code further comprises processing affine types that correspond to a state of an authorization policy.

19. The one or more physical computer-readable storage media of claim 17, wherein type checking the target program determines that the target program complies with security policy, and wherein having further computer-executable instructions comprising:

allowing installation of the target program.

20. The one or more physical computer-readable storage media of claim 19, wherein type checking the target program is performed on a computing system on which the target program is installed, and wherein the computing system does not include the solver.

* * * * *